United States Patent [19]

Campbell

[11] 4,434,607
[45] Mar. 6, 1984

[54] OVERFILL PROTECTION APPARATUS FOR ROLL BALING MACHINE

[75] Inventor: Willis R. Campbell, Ephrata, Pa.

[73] Assignee: Sperry Corporation, New Holland, Pa.

[21] Appl. No.: 405,780

[22] Filed: Aug. 6, 1982

[51] Int. Cl.³ .......................................... A01D 39/00
[52] U.S. Cl. ........................................ 56/341; 100/88
[58] Field of Search ................ 56/10.2, DIG. 15, 341; 100/88, 89, 99, 5

[56] References Cited

U.S. PATENT DOCUMENTS

| 3,934,393 | 1/1976 | Campbell et al. | 56/341 |
| 4,246,743 | 1/1981 | Anstee et al. | 56/341 |
| 4,253,389 | 3/1981 | Campbell et al. | 100/5 |
| 4,343,141 | 8/1982 | Oellig et al. | 100/88 |

OTHER PUBLICATIONS

Operator's Manual OM-E6190 for John Deere 510 Round Baler published in 1977, pp. 18-19, "Adjusting Pickup Drive Release".
Principles of Farm Machinery–Copyright 1978, p. 353, "Overload Protection".

*Primary Examiner*—Gene Mancene
*Assistant Examiner*—David I. Tarnoff
*Attorney, Agent, or Firm*—Darrell F. Marquette; Larry W. Miller; Frank A. Seemar

[57] ABSTRACT

An overfill protection apparatus is provided for a roll baling machine to prevent overfilling the bale chamber. The overfill protection apparatus includes a trip lever and an actuating lever. When the bale chamber is filled to a predetermined level, the trip lever moves from a first to a second position to allow the actuating lever to interrupt the driving of the pickup header of the machine.

17 Claims, 6 Drawing Figures

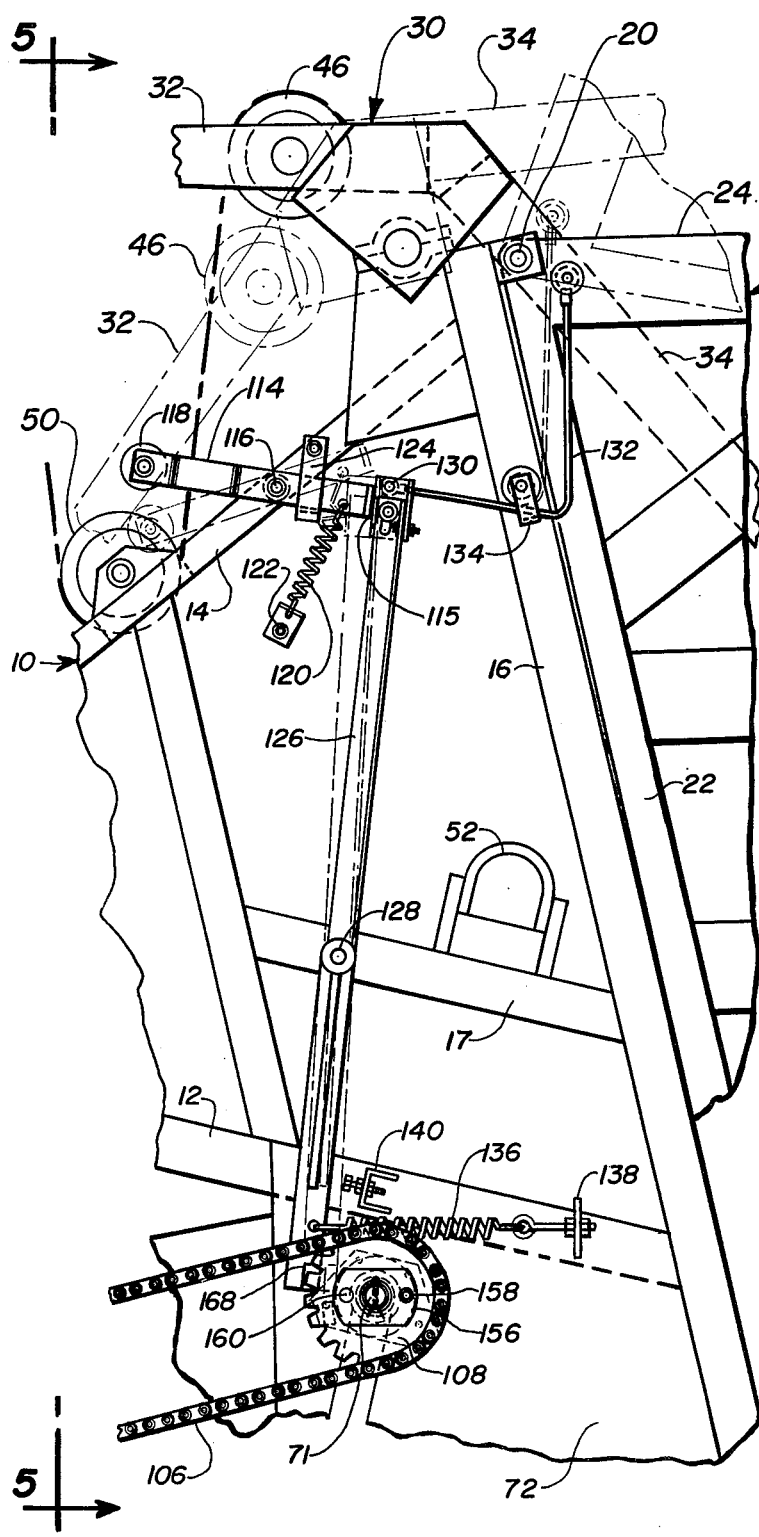
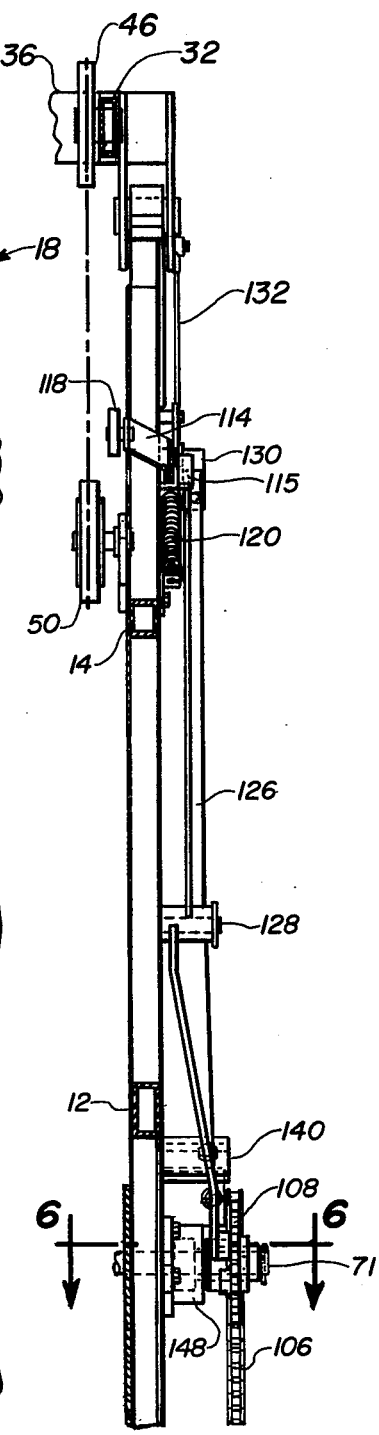

OVERFILL PROTECTION APPARATUS FOR ROLL BALING MACHINE

BACKGROUND OF THE INVENTION

This invention relates generally to roll baling machines typically referred to as "round balers" which form cylindrical roll bales of crop material.

In roll baling machines, structural damage can result if the bale chamber is overfilled while baling. Depending upon the particular type of machine, structural damage may be done to the apron, the apron expansion mechanism, or the drive mechanism for the apron. Visual indicators and sound alarms have been used to indicate when the bale chamber is filled to capacity. These indicators and alarms have proven unsatisfactory, however, because it is very easy for operators to neglect them and overfill the machine.

SUMMARY OF THE INVENTION

The present invention is designed for use on a roll baling machine including a frame, bale forming means movably supported on the frame defining a bale chamber for forming roll bales of crop material, pickup means movably supported on the frame for picking up crop material and delivering it to the bale chamber, and drive means for driving the pickup means. Specifically, the present invention provides an overfill protection apparatus which includes a trip lever and an actuating lever each rotatably supported on the frame. The trip lever is movable between a first position where the actuating lever is prevented from interrupting the driving of the pickup means and a second position where the actuating lever is moved to interrupt the driving of the pickup means. The trip lever moves from the first position to the second position when the bale chamber is filled with crop material to a predetermined level.

BRIEF DESCRIPTION OF THE DRAWINGS

FIG. 4 is an enlarged-plan view of part of the machine of FIG. 1;

FIG. 5 is a view taken along the lines 5—5 of FIG. 4; and

DETAILED DESCRIPTION OF THE PREFERRED EMBODIMENT

Figure 1:
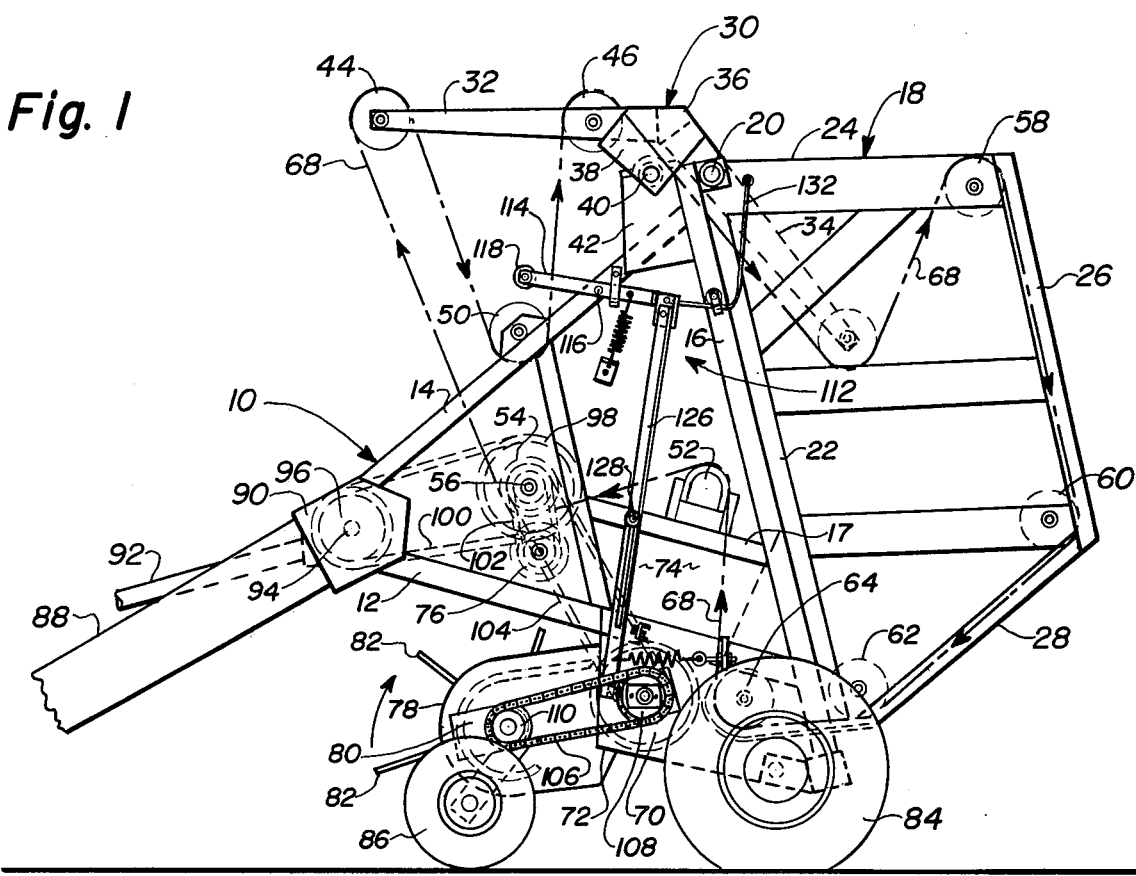
FIG. 1 is a side-elevational view of a roll baling machine embodying the present invention taken when the machine is empty.
Figure 2:
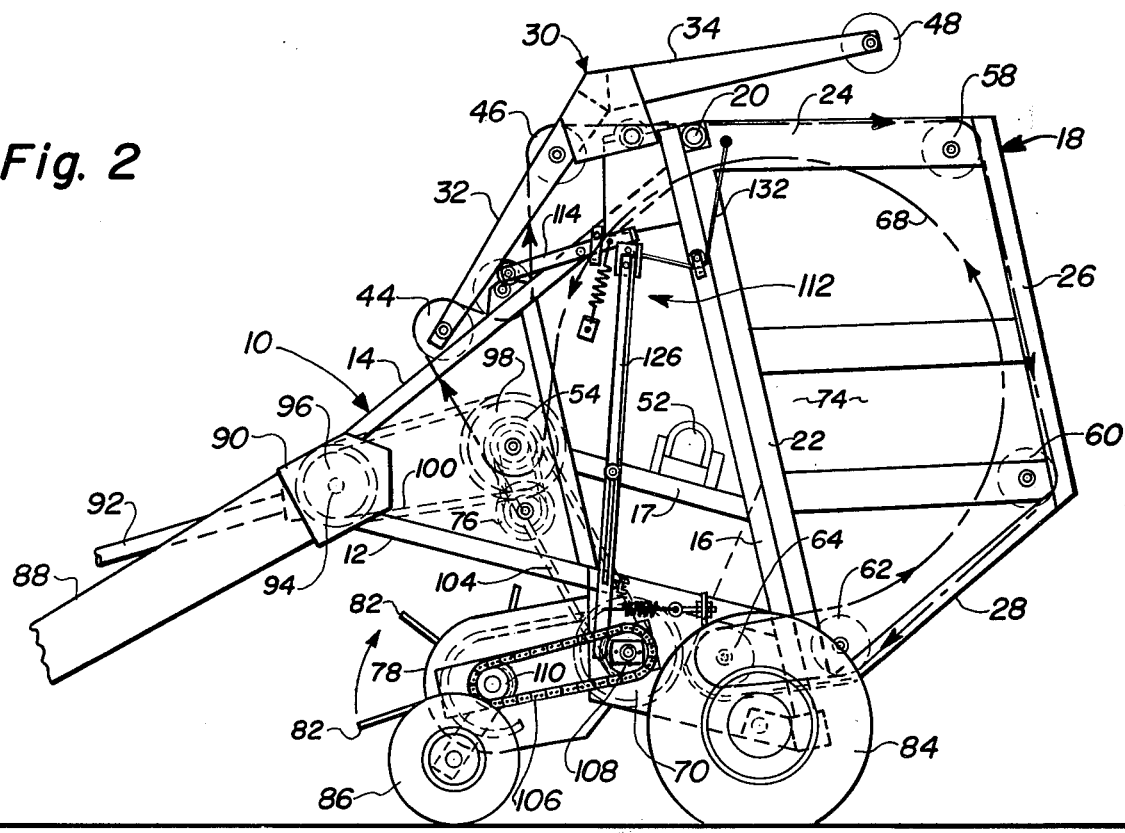
FIG. 2 is a side-elevational view of the machine shown in FIG. 1 when a bale has been formed and is disposed in the machine.
Figure 3:
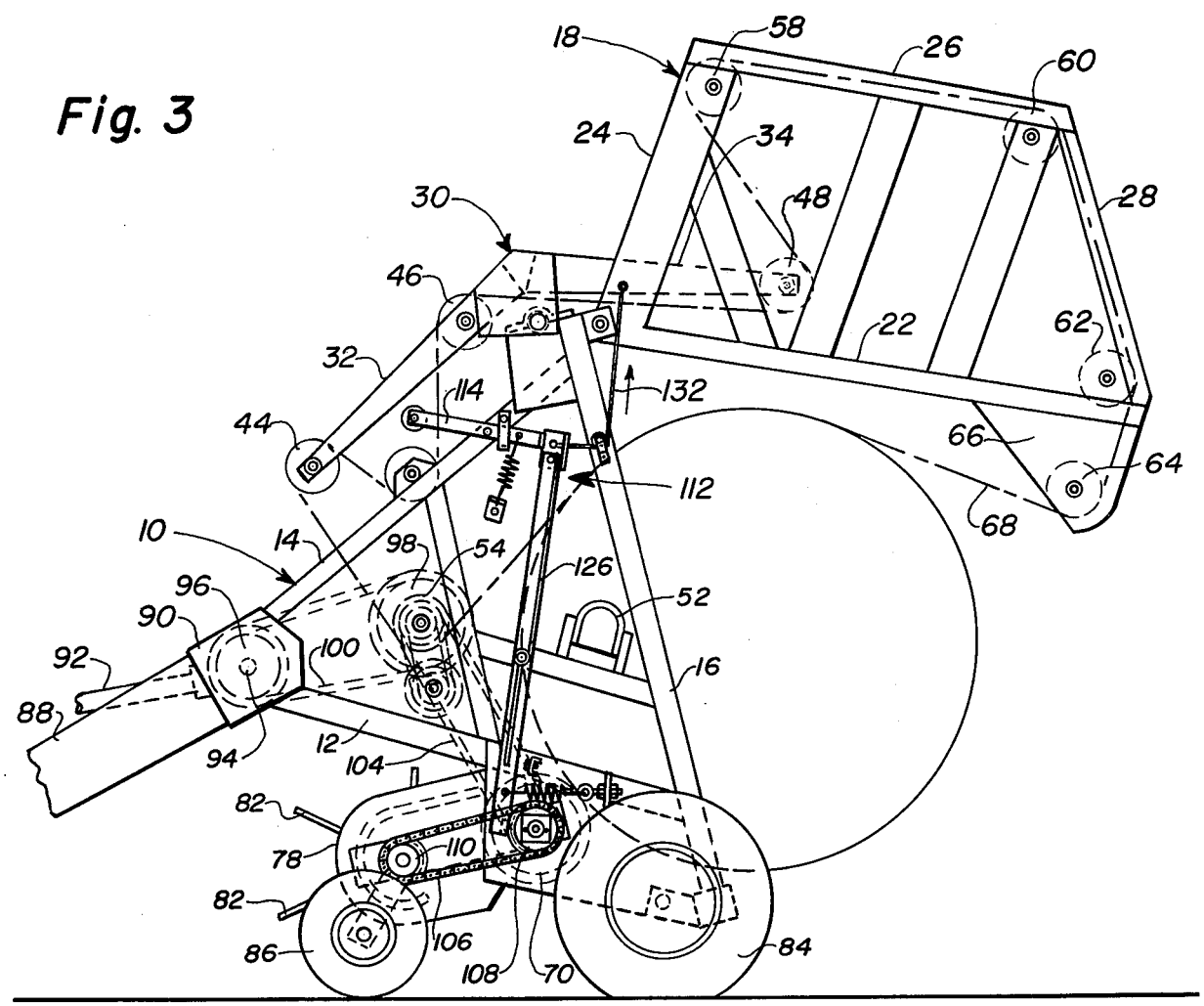
FIG. 3 is a side-elevational view of the machine of FIG. 1 taken as the bale is being discharged from the machine.

Referring to FIG. 1, the roll baling machine embodying the present invention includes a base frame 10 having opposite sides each formed generally of frame members 12,14,16 rigidly connected in a triangular configuration with side plates substantially covering the space therebetween. A rear frame 18 is pivotally connected at 20 to the base frame 10 by suitable bearings. The rear frame 18 has opposite sides each formed generally of frame members 22,24,26,28 rigidly connected in a substantially trapezoidal configuration with side plates substantially covering the space therebetween. Other frame members (not shown) extend transversely of the machine and connect the opposite sides of the base frame 10 and the opposite sides of the rear frame 18. In FIGS. 1–3, the forward end of the machine faces to the left and the rearward end thereof faces to the right.

A pair of hydraulic cylinders (not shown) may be mounted at the sides of the machine and connected between the base frame 10 and the rear frame 18. The hydraulic cylinders would be operated in known manner to move the rear frame 18 upwardly from its lower position shown in FIG. 1 to an upper position.

An arm assembly 30 is rotatably mounted on the base frame 10 and includes front arms 32 and rear arms 34 disposed inboard the sides of the machine. The front and rear arms 32,34 are rigidly connected to a cross beam 36 that extends transversely of the machine. The arm assembly 30 also includes brackets 38 disposed inboard the sides of the machine. The brackets 38 fixedly support shafts 40 which are rotatably mounted in bearing members carried by brackets 42 on the opposite sides of the base frame 10. The arm assembly 30 is normally urged toward the position shown in FIG. 1 by conventional means such as extensions or compression springs (not shown) connected between the arm assembly 30 and the base frame 10.

The arm assembly 30 carries rotatable guide members 44,46 on the front arms 32 and rotatable guide members 48 on the rear arms 34. The base frame 10 supports rotatable guide members 50 on the frame members 14 and cam guide members 52 inboard its opposite sides on the frame members 17. Preferably, the cam guide members 52 are of the known type disclosed in U.S. Pat. No. 3,901,007 and designated therein by the numeral "118". Sprockets 54 are provided inboard the opposite sides of the base frame 10 and are fixed on a shaft 56 that is rotatably mounted in suitable bearings on the base frame 10. The rear frame 18 supports rotatable guide members 58,60,62,64 inboard its opposite sides. As best seen in FIG. 3, the guide members 64 are carried on brackets 66 projecting from the frame members 22 of the rear frame 18.

A flexible bale forming apron 68 is movably supported on the aforementioned guide members and sprockets following the path shown in FIG. 1 when the machine is empty. The apron 68 is preferably formed of a pair of endless link-type chains connected at spaced intervals by transverse bars or slats. The apron chains extend around and engage the various guide members and the sprockets 54. This apron 68 is of the known type disclosed in U.S. Pat. No. 3,901,007 and designated therein by the numeral "82".

A floor roller 70 extends transversely of the machine and is rotatably supported by brackets 72 on the opposite sides of the base frame 10. Preferably, the floor roller 70 consists of a hollow metal drum with a coating or layer of rubber on its outer surface. When the machine is empty as seen in FIG. 1, the upper surface of the floor roller 70 cooperates with a course of the apron 68 extends upwardly and rearwardly from the guide members 64 over the cam guide members 52 and then downwardly and forwardly to the sprockets 54 to define a bale chamber 74 having an initial wedge shape in side elevation. In this initial wedge shape, the forward end of the bale chamber 74 is narrower than the rearward end thereof. A stripper roller 76, preferably rubber coated, extends transversely of the machine and is rotatably supported on the opposite sides of the base frame 10. The stripper roller 76 is positioned at the forward end of the bale chamber 74 in close proximity to the apron 68.

A pickup header 78 extends transversely of the machine and is supported by brackets 80 on the opposite sides of the base frame 10. The pickup header 78 is preferably of conventional type having a series of projecting fingers 82 rotating in the path indicated for engaging and picking up windrowed crop material. A pair of wheels 84 mounted on the opposite sides of the base frame 10 support the machine. Another pair of wheels 86 are mounted to the brackets 80 to provide support primarily for the pickup header 78. A tongue 88 is provided on the forward end of the base frame 10 for connection to a tractor.

A gear box 90 is mounted on the base frame 10. An input shaft 92 is connected at one end to the gear box 90, and the other end of the input shaft 92 is adapted for connection to the power take off unit (PTO) of a tractor (not shown). An output shaft 94, extends from the gear box 90 toward a side of the machine and has a sheave 96 fixed thereto. Another sheave 98 is fixed on the shaft 56 at the same side of the machine as the sheave 96, and a belt 100 extends around the sheaves 96 and 98. A chain 102 extends around a sprocket fixed on the shaft 56 and a sprocket fixed on the support shaft of the stripper roller 76. A chain 104 extends around another sprocket fixed on the shaft 56 and a sprocket mounted on the support shaft of the floor roller 70. A chain 106 extends around a sprocket 108 fixed on the support shaft 71 of the floor roller 70 and a sprocket 110 fixed on the drive shaft of the pickup header 78.

Rotary driving power is delivered from the PTO of a tractor through the input shaft 92, the gear box 90, and the output shaft 94 to the sheave 96. This causes rotation of the sheave 96 in the direction indicated which in turn causes rotation of the sheave 98 in the same direction via the belt 100. Such rotation of the sheave 98 causes rotation of the shaft 56 and the sprockets 54 and others fixed thereto. The sprockets 54 drive the apron chains thereby propelling the apron 68 around the various guide members in the base frame 10 and the rear frame 18 in the direction and along the path indicated. The rotation of the shaft 56 drives the chain 104 thereby rotating the floor roller 70 in the direction indicated. The rotation of the shaft 56 also drives the chain 102 thus rotating the stripper roller 76 in the direction indicated. The rotation of the floor roller 70 in turn causes rotation of the sprocket 108 which drives the sprocket 110 via the chain 106 thereby rotating the fingers 82 of the pickup header 78 in the direction indicated. The various chains and sprockets may be sized so that the parts of the machine operate at any desired speeds. For example, the apron chains, the chain 104, and the sprockets engaged therewith are preferably sized so that the peripheral speed of the floor roller 70 is equal to or slightly higher than the speed of the apron 68. This tends to keep a roll of crop material toward the rearward end of the machine during formation.

As the machine is pulled across a field by a tractor, the pickup header fingers 82 engage, pick up and deliver windrowed crop material onto the upper surface of the rotating floor roller 70 in the bale chamber 74. The crop material is carried upwardly and then coiled back downwardly onto itself by the apron 68 which moves upwardly and rearwardly from the guide members 64 over the cam guide members 52 and then downwardly and forwardly to the sprockets 54. This movement of the apron 68 in the bale chamber 74 effectively starts the core of the roll bale. The rotating stripper roller 76 removes crop material from the apron 68 at the forward end of the bale chamber 74 and delivers it back downwardly into the bale chamber 74. The roll bale increases in diameter lifting the inner course of the apron 68 that extends between the guide members 64 and the sprockets 54 off the cam guide members 52, and expanding the bale chamber 74 from its initial wedge shape to a substantially circular shape. The expansion of the bale chamber 74 results in movement of the inner course of the apron 68 into the rear frame 18. This movement of the apron 68 is accomplished by rotation of the arm assembly 30 in a counterclockwise direction from the position shown in FIG. 1. When it is desired to discharge the completed bale from the machine, the rear frame 18 is raised upwardly as shown in FIG. 3. This stretches the inner course of the apron 68 across the space between the guide members 64 and the sprockets 54 thereby assisting the bale to exit the machine. The bale rotates in a generally clockwise direction as viewed in FIG. 3 as it exits the machine.

According to the present invention, an overfill protection apparatus 112 is provided on the roll baling machine of FIGS. 1-3. The overfill protection apparatus 112, also shown in FIG. 4, preferably includes a trip lever 114 connected at a pivotal mounting 116 to a frame member 14 of the base frame 10. The trip lever 114 carries a roller 118 at one end thereof aligned for engagement with one of the front arms 32 of the arm assembly 30. A spring 120 is connected at one end to the trip lever 114 and at the other end to a mounting bracket 122 on the base frame 10 normally urging the trip lever 114 for rotation in a clockwise direction about pivotal mounting 116 as viewed in FIG. 4. A bracket 124 mounted on the base frame member 14 limits the rotation of the trip lever 114 in both directions.

The overfill protection apparatus 112 also preferably includes an actuating lever 126 connected at a pivotal mounting 128 to a frame member 17 of the base frame 10. The actuating lever 126 includes a detachable part 130 at its upper end arranged for engagement with the flat end portion 115 of the trip lever 114. A cable 132 is connected at one end to the detachable part 130 and at the other end to a frame member 24 of the rear frame 18. The cable 132 extends through a guide mechanism 134 mounted on the base frame member 16. A spring 136 is connected at one end to the actuating lever 126 and at the other end to a mounting bracket 138 secured to a frame member 12 of the base frame 10 normally urging the actuating lever 126 for rotation in a counterclockwise direction about pivotal mounting 128 as viewed in FIG. 4. A stop member 140 mounted on the base frame member 12 limits the rotation of the actuating lever 126 in the counterclockwise direction.

Figure 6:
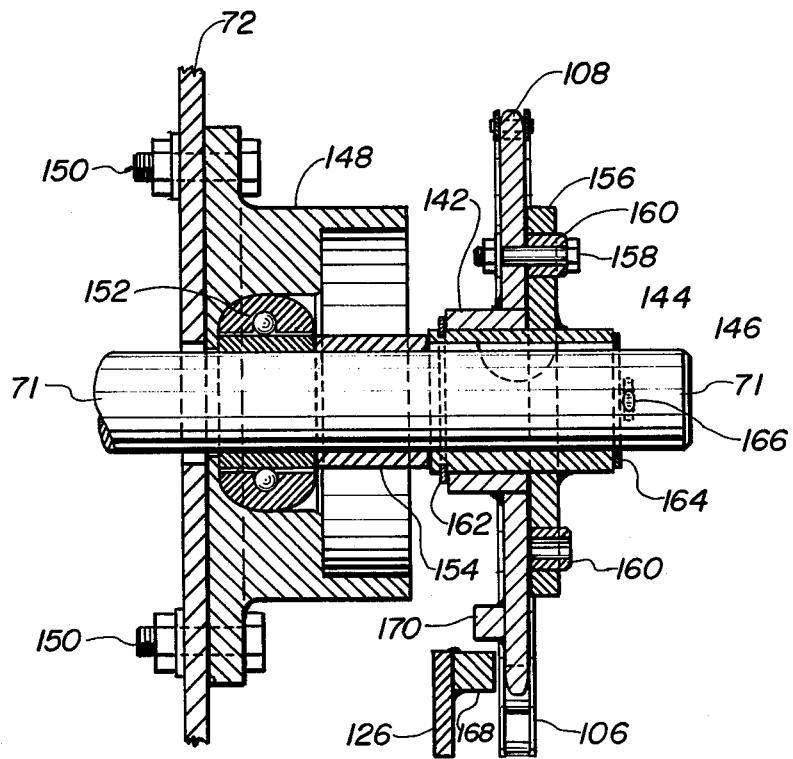
FIG. 6 is a sectional view taken along the lines 6—6 of FIG. 5.

Referring now to FIG. 6, it will be seen that the sprocket 108 which drives the pickup header 78 via the chain 106 is welded to an annular sleeve 142. The annular sleeve 142 is rotatably mounted on a bearing member 144 which has a keyed connection 146 with the support shaft 71 of the floor roller 70 in order to rotate therewith. The floor roller support shaft 71 is rotatably mounted in a hub and bearing assembly 148 that is fastened to the base frame brackets 72 by bolts 150. The hub and bearing assembly 148 includes a conventional ball bearing 152. An annular spacer 154 is disposed between the ball bearing 152 and the bearing member 144. A drive hub 156 is welded to the bearing member 144 and is fastened to the sprocket 108 by a shear bolt 158. The shear bolt 158 extends through one of two bushings 160 in the drive hub 156 and through a hole in the sprocket 108. A retainer ring 162 engages a groove in the bearing member 144 to retain the sleeve 142 and the attached sprocket 108 in abutting engagement with the drive hub 156. A washer 164 and a cotter pin 166 are mounted on the floor roller support shaft 71 to hold the bearing member 144 thereon. A pawl 168 formed on the actuating lever 126 is aligned for engagement with a lug 170 formed on the sprocket 108.

During normal baling, the trip lever 114 and the actuating lever 126 remain in the positions shown in FIG. 1. With the actuating lever 126 in this position, the pawl 168 thereon is out of the path of movement of the lug 170 on the sprocket 108 as the sprocket 108 is rotated with the floor roller 70 in order to drive the pickup header 78 via the chain 106. The sprocket 108 is drivingly connected to the drive hub 156 by the shear bolt 158. Therefore, rotation of the floor roller support shaft 71 results in concurrent rotation of the drive hub 156 and the sprocket 108 so that the driving of the pickup header 78 is uninterrupted.

If the operator attempts to overfill the bale chamber 74, the arm assembly 30 with be rotated far enough counterclockwise from the position of FIG. 1 so that the one front arm 32 will engage the roller 118 and rotate the trip lever 114 in a counterclockwise direction about the pivotal mounting 116 as shown in FIG. 2. This moves the flat end portion 115 of the trip lever 114 out of engagement with the detachable part 130 of the actuating lever 126. The spring 136 then urges the actuating lever 126 to rotate in a counterclockwise direction about pivotal mounting 128. This moves the pawl 168 on the actuating lever 126 into the path of movement of the lug 170 on the sprocket 108. The lug 170 contacts the pawl 168 resulting in the shearing of the shear bolt 158. The sprocket 108 is then drivingly disconnected from the drive hub 156, and the driving of the pickup header 78 is interrupted. The fingers 82 of the pickup header 78 stop rotating and no more crop material can be fed into the bale chamber 74 until the bale is discharged.

When the rear frame 18 is raised to discharge the bale, the actuating lever 126 is rotated by the cable 132 in a clockwise direction about pivotal mounting 126. The actuating lever 126 is rotated far enough clockwise to allow the trip lever 114 to be rotated by the spring 120 in a clockwise direction about pivotal mounting 116. The flat end portion 115 of the trip lever 114 is reengaged with the detachable part 130 of the actuating lever 126 as shown in FIG. 3. A new shear bolt 158 is inserted through one of the bushings 160 in the drive hub 156 and through the hole in the sprocket 108. The sprocket 108 is again drivingly connected to the drive hub 156, and the baling machine is ready to continue making bales. As an alternative, the cable 132 could be eliminated and the trip lever 114 and actuating lever 126 could be reset manually to the positions shown in FIG. 1 after the bale is discharged.

It will be understood that two bushings 160 are provided so that the drive hub 156 will never have to be rotated more than a quarter of a revolution to insert a new shear bolt 158. Obviously, additional bushings may be provided if desired.

It will also be understood that the detachable part 130 may be adjusted upward or downward on the actuating lever 126 in order to vary the amount of rotational movement of the trip lever 114 that is needed to disengage the flat end portion 115 of the trip lever 114 from the detachable part 130.

The present invention is not limited to use on roll baling machines that employ the particular type of apron 68 and may be used on roll baling machines having other types of aprons such as the well-known type formed of a series of endless flat belts.

The following claims are intended to cover all modifications and variations of the preferred embodiments of the invention without departing from the spirit and scope of the invention.

Having thus described the invention, what is claimed is:

1. A roll baling machine comprising:
   (a) a frame;
   (b) bale forming means movably supported on said frame defining a bale chamber for forming roll bales of crop material;
   (c) pickup means movably supported on said frame for picking up crop material and delivering it to said bale chamber;
   (d) drive means for driving said pickup means;
   (e) a trip lever rotatably supported on said frame;
   (f) an actuating lever rotatably supported on said frame;
   (g) said trip lever being movable between a first position where said actuating lever is prevented from interrupting the driving of said pickup means and a second position where said actuating lever is moved to interrupt the driving of said pickup means; and
   (h) said trip lever moving from said first position to said second position when said bale chamber is filled with crop material to a predetermined level.

2. The roll baling machine according to claim 1, wherein said bale forming means comprises an apron, and said drive means is connected between said apron and said pickup means.

3. The roll baling machine according to claim 1, wherein said drive means includes a shear bolt, and said actuating lever operates to cause shearing of said shear bolt in order to interrupt the driving of said pickup means.

4. The roll baling machine according to claim 1, further comprising an arm assembly rotatably mounted on said frame supporting part of said bale forming means, and wherein said arm assembly rotates and engages said trip lever for moving it from said first position to said second position.

5. The roll baling machine according to claim 4, further comprising spring means urging said trip lever toward said first position.

6. The roll baling machine according to claim 1, wherein said bale forming means comprises an apron including endless flexible members and transverse members extending between and interconnecting said endless flexible members.

7. In a roll baling machine including a frame, bale forming means movably supported on said frame defining a bale chamber for forming roll bales of crop material, pickup means movably supported on said frame for picking up crop material and delivering it to said bale chamber, drive means for driving said pickup means, the improvement of an apparatus to prevent overfilling said bale chamber with crop material, comprising:
   (a) a trip lever rotatably supported on said frame;

(b) an actuating lever rotatably supported on said frame;

(c) said trip lever being movable between a first position where said actuating lever is prevented from interrupting the driving of said pickup means and a second position where said actuating lever is moved to interrupt the driving of said pickup means; and (d) said trip lever moving from said first position to said second position when said bale chamber is filled with crop material to a predetermined level.

8. The improvement according to claim 7, wherein said bale forming means comprises an apron, and said drive means is connected between said apron and said pickup means.

9. The improvement according to claim 7, wherein said drive means includes a shear bolt, and said actuating lever operates to cause shearing of said shear bolt in order to interrupt the driving of said pickup means.

10. The roll baling machine according to claim 3, wherein said pickup means comprises a plurality of fingers rotatable in a predetermined path to pick up crop material, and said shear bolt is normally connected to be rotatable with said plurality of fingers.

11. The roll baling machine according to claim 10, further comprising a floor roller rotatably supported on said frame and cooperating with said bale forming means to form roll bales, and wherein said shear bolt is normally connected to be further rotatable with said floor roller.

12. The roll baling machine according to claim 11, further comprising said floor roller including a support shaft rotatably mounted on said frame, a hub fixed to rotate with said support shaft, a sprocket disposed on said support shaft and connected for driving said plurality of fingers of said pickup means in said predetermined path, and wherein said shear bolt normally connects said sprocket to rotate with said hub and said support shaft.

13. The roll baling machine according to claim 12, wherein said actuating lever is moved into the path of movement of said shear bolt when said bale chamber is filled to said predetermined level in order to cause shearing of said shear bolt and thereby interrupt the driving of said pickup means.

14. The improvement according to claim 9, wherein said pickup means comprises a plurality of fingers rotatable in a predetermined path to pick up crop material, and said shear bolt is normally connected to be rotatable with said plurality of fingers.

15. The improvement according to claim 14, further comprising a floor roller rotatably supported on said frame and cooperating with said bale forming means to form roll bales, and wherein said shear bolt is normally connected to be further rotatable with said floor roller.

16. The improvement according to claim 15, further comprising said floor roller including a support shaft rotatably mounted on said frame, a hub fixed to rotate with said support shaft, a sprocket disposed on said support shaft and connected for driving said plurality of fingers of said pickup means in said predetermined path, and wherein said shear bolt normally connects said sprocket to rotate with said hub and said support shaft.

17. The improvement according to claim 16, wherein said actuating lever is moved into the path of movement of said shear bolt when said bale chamber is filled to said predetermined level in order to cause shearing of said shear bolt and thereby interrupt the driving of said pickup means.

* * * * *